(12) United States Patent
Washington et al.

(10) Patent No.: US 9,056,669 B2
(45) Date of Patent: Jun. 16, 2015

(54) HARDWARE-BASED WEIGHT AND RANGE LIMITATION SYSTEM, APPARATUS AND METHOD

(71) Applicant: Aurora Flight Sciences Corporation, Manassas, VA (US)

(72) Inventors: Tom Washington, Manassas, VA (US); Thorsten Hisam, Manassas, VA (US); Martin Gomez, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 13/632,849

(22) Filed: Oct. 1, 2012

(65) Prior Publication Data

US 2013/0085629 A1 Apr. 4, 2013

Related U.S. Application Data (60) Provisional application No. 61/541,411, filed on Sep. 30, 2011.

(51) Int. Cl.
| | |
|---|---|
| *G06F 19/00* | (2011.01) |
| *G06G 7/70* | (2006.01) |
| *B64C 13/18* | (2006.01) |
| *B64D 45/00* | (2006.01) |
| *G05D 1/00* | (2006.01) |
| *G08G 5/00* | (2006.01) |

(52) U.S. Cl.
CPC ............... *B64C 13/18* (2013.01); *B64D 45/00* (2013.01); *G05D 1/0055* (2013.01); *G08G 5/0021* (2013.01); *G08G 5/0039* (2013.01); *G08G 5/006* (2013.01); *B64C 2201/145* (2013.01)

(58) Field of Classification Search
CPC ....... G08G 5/0021; G08G 5/0065; G08G 5/06; G01C 23/00; G05D 1/0661
USPC .......................................................... 701/15
See application file for complete search history.

(56) References Cited

U.S. PATENT DOCUMENTS

| | | | | |
|---|---|---|---|---|
| 4,122,522 | A * | 10/1978 | Smith | 701/15 |
| 8,068,950 | B2 * | 11/2011 | Duggan et al. | 701/24 |
| 2005/0004723 | A1 * | 1/2005 | Duggan et al. | 701/24 |
| 2005/0187677 | A1 | 8/2005 | Walker | |

(Continued)

OTHER PUBLICATIONS

Missile Technology Control Regime, MTCR, available online @ http://www.mtcr.info/english/objectives.html, last accessed Jan. 26, 2014, pp. 1-2 of 2.*

(Continued)

*Primary Examiner* — Behrang Badii
*Assistant Examiner* — Daniel L Greene
(74) *Attorney, Agent, or Firm* — Katten Muchin Rosenman LLP (57) ABSTRACT

The present disclosure endeavors to provide systems, methods and apparatus for ensuring aircraft compliance with governmental guidelines, such as, for example, Missile Technology Control Regime (MTCR) Category II compliance. A hardware-based system may be employed to reduce range and/or payload below predetermined ranges and a payload capacities. Also provided herein are hardware-based systems, methods, and apparatus for restricting a system's range to predetermined range and/or the payload to a predetermined limit using, for example, an Application-Specific Integrated Circuit (ASIC) installed in the flight control system.

25 Claims, 6 Drawing Sheets

(56) References Cited

U.S. PATENT DOCUMENTS

2010/0318475 A1   12/2010   Abrahamson
2011/0035149 A1*   2/2011   McAndrew et al. .......... 701/205

OTHER PUBLICATIONS

MTCR/TEM/2013/Annex, Oct. 17, 2013, Missile Technology Control Regime, available online @ http://www.mtcr.info/english/MTCR-TEM-Technical_Annex_2013-10-17.pdf, last accessed Jan. 26, 2014, ages 1-77 of 77.*
{PhysRevLett.108.130503, {Measurement-Device-Independent Quantum Key Distribution}, Lo, Hoi-Kwong et al., Mar. 30, 2012, 5 pages, available online @ http://journals.aps.org/prl/abstract/10.1103/PhysRevLett.108.130503: last accessed Aug. 7, 2014.*
Lo, Hoi-Kwong et al., Measurement Device Independent Quantum Key Distribution, Phys. Rev. Lett. 108, 130503 (May 30, 2012), 7 Pages.
Politecnico Di Milano—Dipartimento Di Ingegneria Aerospaziale, Aircraft Systems—Lecture Notes, Version 2004, Chapter 6, Flight Control System, pp. 6.1-6.11.
ASIC Chip Development, ALTERA, HardCopy III ASICs: Technology for Business, copyright 1995-2011, 1 Page.
Field-programmable gate array from Wikipedia, the free encyclopedia, retrieved from <http://en.wikipedia.org/wiki/Field-programmable_gate_array> on Jul. 11, 2011, pp. 1-8.
Figure 3-7. Integrated Flight control System Block Diagram retrieved from <http://aviationandaccessories.tpub.com/TM-1-1510-224-10/css/TM-1-1510-224-10_135.htm> on Jul. 14, 2011, pp. 1-2.
Transmittal; International Search Report; and Written opinion of the International Searching Authority for International Patent Application No. PCT/US2012/058323 with a mailing date of Jul. 5, 2013.
Federal Information Processing Standards Publication, Security Requirements for Cryptographic Modules, issued May 25, 2001, 69 pages, i-61.

* cited by examiner

HARDWARE-BASED WEIGHT AND RANGE LIMITATION SYSTEM, APPARATUS AND METHOD

TECHNICAL FIELD

The present invention relates to Systems and Methods for Range and/or Payload Limitation System (RPLS). More specifically, the present invention relates to Systems and Methods for RPLS for Missile Technology Control Regime (MTCR) Category II Optionally Piloted Aircraft (OPA) and Unmanned Aerial Vehicles (UAV) and Systems and Methods for Complying with Aircraft Export Security Controls.

BACKGROUND INFORMATION

Export of a OPA or UAV requires approval by the U.S. Department of State and the system has to meet MTCR guidelines. The guidelines are established by international treaty and governed by representatives from the signatory countries. Generally speaking, MTCR Category I items have a strong presumption for denial of export. MTCR Category I items include, for example, all OPAs and UAVs that have a range over 300 km and a payload capacity over 500 kg. However, items below that range and/or payload are typically considered MTCR Category II items and are likely to gain export approval. For further information on MTCR guidelines, see MTCR's website, available at http://www.mtcr.info/english. Therefore, it is advantageous for OPAs and UAVs to be restricted to a range under 300 km and/or a payload less than 500 kg.

While there are no known prior attempts to make OPAs compliant with MTCR Category II, prior attempts to conform UAVs with MTCR requirements have been made. Unfortunately, they fail to address the various objectives of the present invention. These attempts include, for example, U.S. Patent Publication Number 2010/0318475 to Abrahamson, entitled "Method For Meeting U.S. Government Security Controls Under Export Control Regimes." Abrahamson discloses a business method for enabling full conformance and probable approval within the U.S. International Export Controls, such as the Export Administration Regulation (EAR), the International Traffic in Arms Regulation (ITAR), and the international Missile Technology Control Regime (MTCR), even though the item may normally be precluded from export. The method includes filing an application for a license to exploit the technology; the application includes commitments by the participants to comply with and follow certain security-related procedures, including a service lease, security compliance training, pre-approval of technical disclosures, and operations and task compartmentalization among the parties.

Similarly, BAE Systems Australia has a UAV software-based system for controlling the airspace which a UAV may enter. The software, referred to as "3D Flight Extents", is part of BAE's Autonomous Navigation and Sensing Experimental Research (ANSER) project. However, 3D Flight Extents is simply software-based and used to control the UAV in three dimensions with the simple goal of airspace deconfliction. As with Abrahamson, 3D Flight Extents fails to address implementation of range and load limitations for increasing MTCR Category II compliance.

Available UAV-based solutions for the limitation of performance parameters needed to meet MTCR Category II are either (i) software-based or (ii) require modifications to the airframe. However, both of these solutions are unacceptable. A software-based system would not be acceptable under the MTCR guidelines, and airframe modifications would not be an option for an OPA capable of maintaining full operational performance in the manned mode as well as the unmanned mode.

Thus, to ensure an aircraft falls within MRCR Category II, there is a need for hardware-based system modifications that may be employed to reduce range and/or payload below a range of 300 km and a payload capacity under 500 kg. Thus, a non-software-based solution is necessary for restricting a system's range to predetermined range and/or the payload to a predetermined limit using, for example, a Application-Specific Integrated Circuit (ASIC) installed in the flight control system.

SUMMARY

The present disclosure endeavors to provide a non-software-based solution for restricting a system's range to a predetermined range and/or the payload to a predetermined limit using, for example, an Application-Specific Integrated Circuit (ASIC) coupled with a flight control system.

According to a first aspect of the present invention, a hardware-based system for restricting a vehicle, comprises: a GPS (Global Positioning System) receiver enabled to provide the vehicle's position; a storage device capable of having data stored thereon; an inclinometer; a sensor for determining air speed; a range calculation circuit, wherein the range calculation circuit is enabled to calculate a range value; a weight limitation circuit, wherein the weight limitation circuit is enabled to calculate the vehicle's payload; and a device enabled to communicate an approval-to-proceed signal in response to an approval-to -proceed request.

In certain aspects, the weight limitation circuit may perform the steps of: dynamically calculating the vehicle's take-off acceleration; comparing the calculated take-off acceleration to one or more known take-off acceleration values; and determining whether the calculated take-off acceleration exceeds a predetermined take-off acceleration threshold value, wherein the predetermined take-off acceleration threshold value corresponds to a known payload value. Likewise, the range limitation circuit may perform the steps of: dynamically calculating the vehicle's location; calculating the distance between the calculated location and a stored location (e.g., the take-off location); and determining whether the calculated distance exceeds a predetermined distance threshold value, the predetermined distance threshold value signifying a known range value.

According to a second aspect of the present invention, a method for restricting a vehicle, comprises: dynamically calculating the vehicle's take-off acceleration; comparing the calculated take-off acceleration to one or more known take-off acceleration values; determining whether the calculated take-off acceleration exceeds a predetermined maximum take-off acceleration threshold value, wherein the maximum predetermined take-off acceleration threshold value corresponds to a known payload value; dynamically calculating the vehicle's location; calculating the distance between the calculated location and a stored location; determining whether the calculated distance exceeds a predetermined maximum distance threshold value, the predetermined maximum distance threshold value signifying a maximum range value; and communicating an approval-to-proceed signal if (i) the calculated take-off acceleration does not exceed the predetermined maximum take-off acceleration threshold value and (ii) the calculated distance does not exceed the predetermined maximum distance.

According to a second aspect of the present invention, an apparatus for restricting a vehicle, comprises: a processor; a storage device capable of having data stored thereon; a range calculation circuit for dynamically calculating a range value using current GPS coordinates and stored GPS coordinates, wherein the calculated range value is compared to a stored maximum range threshold value; a weight limitation circuit for dynamically calculating the vehicle's payload by comparing take-off acceleration to a stored maximum take-off acceleration threshold value; and a device enabled to communicate an approval-to-proceed signal when a condition is met in response to an approval-to-proceed request.

The condition may not be met when, for example, (i) the calculated take-off acceleration exceeds the predetermined maximum take-off acceleration threshold value and/or (ii) the calculated distance exceeds the predetermined maximum distance.

In certain aspects, the device enabled to communicate an approval-to-proceed signal may encrypt the approval-to-proceed signal prior to communicating the approval-to-proceed signal. The approval-to-proceed signal may encrypted using, for example, a key having a size of at least 128 bits. The approval-to-proceed signal may not be communicated if (i) the calculated take-off acceleration exceeds predetermined maximum take-off acceleration threshold value (e.g., a value corresponding to a payload value of 500 kg or more) and/or (ii) the calculated distance exceeds a predetermined maximum distance threshold value (e.g., a range value of about 300 km or more).

In some embodiments, a warning signal may be communicated if the calculated distance exceeds a predetermined warning distance threshold value.

BRIEF DESCRIPTION OF THE DRAWINGS

These and other advantages of the present invention will be readily understood with reference to the following specifications and attached drawings wherein.

DETAILED DESCRIPTION

The present disclosure endeavors to provide a non-software-based solution for restricting a system's range and/or the payload using, for example, a Application-Specific Integrated Circuit (ASIC) installed in the flight control system. Preferred embodiments of the present invention will be described hereinbelow with reference to the accompanying drawings. In the following description, well-known functions or constructions are not described in detail, since they would obscure the invention in unnecessary detail. For this application, the following terms and definitions shall apply:

The terms "communicate" and "communicating," as used herein, refer to both transmitting, or otherwise conveying, data from a source to a destination and delivering data to a communications medium, system, channel, network, device, wire, cable, fiber, circuit, and/or link to be conveyed to a destination.

The term "computer," as used herein, refers to a programmable device designed to sequentially and automatically carry out a sequence of arithmetic or logical operations, including without limitation, personal computers (e.g., those available from Gateway, Hewlett-Packard, IBM, Sony, Toshiba, Dell, Apple, Cisco, Sun, etc.), handheld processor-based devices, and any other electronic device equipped with a processor or microprocessor.

The term "database," as used herein, refers to an organized body of data, regardless of the manner in which the data or the organized body thereof is represented. For example, the organized body of data may be stored to a storage device (e.g., a computer-readable medium, such as, for example, a hard drive, flash memory, etc.) in the form of one or more of a table, map, grid, packet, datagram, frame, file, e-mail, message, document, report, list, or in any other form.

The term "network," as used herein, refers to networks and inter-networks of all kinds, including the Internet, but is not limited to any particular network or inter-network.

The term "processor," as used herein, refers to processing devices, apparatus, programs, circuits, components, systems and subsystems, whether implemented in hardware, tangibly embodied software or both, and whether or not programmable. The term "processor," as used herein includes, but is not limited to, one or more computers, hardwired circuits, signal modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, and data processors.

Objectives of a Hardware-Based Weight and Range Limitation System (HBWRL System) include, for instance, (i) preventing continued flight beyond a predetermined range from the take-off site and (ii) prohibiting aircraft take-off when the payload exceeds a maximum payload value. These objectives may be accomplished by modifying the Flight Control System (FCS) to depend upon an externally-provided Approval-to-Proceed signal, which is generated by the HBWRL System. The HBWRL System would be useful in situations where an aircraft is to be regulated to order comply with third party guidelines line. For example, a HBWRL System may be readily applied to OPA and/or UAV markets seeking export of, for example, MTCR Category I aircraft systems that need to have their performance reduced to meet MTCR Category II guidelines. According to the U.S. Department of State, the U.S. Government has been "looking for a provider to develop the most capable MTCR Category II OPA/UAV possible." The HBWRL System facilitates this need because an aircraft and FCS are able to retain their long endurance and otherwise perform at the very top of the MTCR Category II limits, thus producing the most capable MTCR Category II OPA/UAV possible.

Figure 1A:
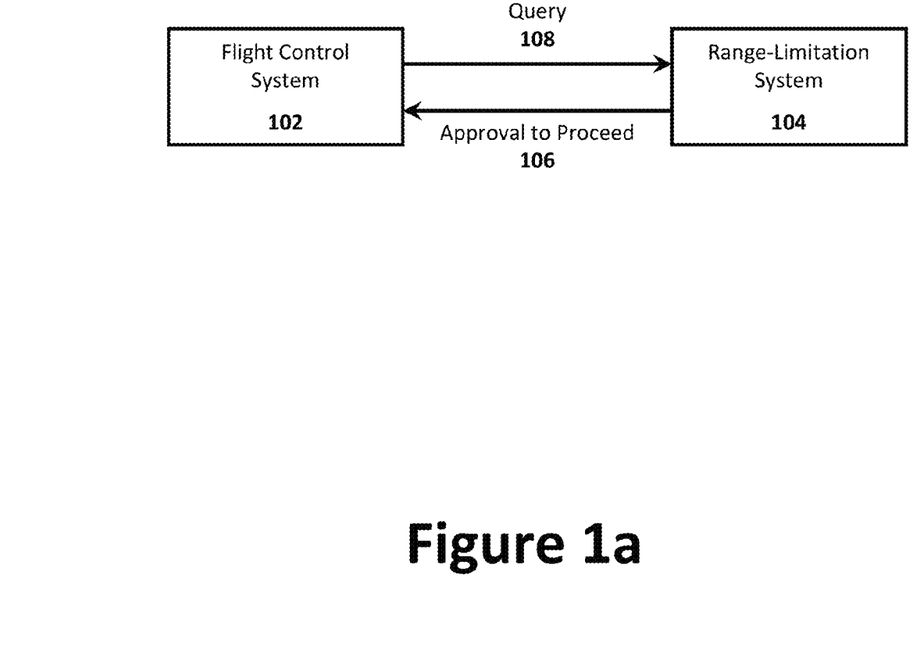
FIG. 1a is a block diagram illustrating an exemplary Approval-to-Proceed signal exchange between a Flight Control System (FCS) and an Hardware-Based Weight and Range Limitation System (HBWRL) System.

A typical FCS generally comprises flight control surfaces (e.g., wings, rudder, etc.), the respective controls, connecting linkages, and the necessary operating mechanisms to control an aircraft's direction in flight. In some instance, aircraft engine controls may also be considered flight controls as they change speed. For additional information regarding basic FCS operation, see, for example, Referring now to FIG. 1a, the basic relationship between a FCS 102 and a HBWRL System 104 is shown. In operation, the FCS 102 may continually query 108 the HBWRL System 104 (e.g., every 1-300 seconds, more preferably, 1-180 seconds, even more preferably, 1-120 seconds, most preferably, 1-60 seconds) for an Approval-to-Proceed signal 106, which is generated by the HBWRL System. In response to each query 108, the HBWRL System 104 may communicate an approval-to-proceed signal 106 to the FCS 102 based on the HBWRL's one or more calculations. In the absence of the approval-to-proceed signal 106, the FCS 102 will typically perform one of two things: (i) if the aircraft is on the ground, the FCS 102 will abort the take-off and (ii) if the aircraft is airborne, the FCS 102 will adjust its flight path causing the aircraft to fly toward the take-off site.

Figure 1B:
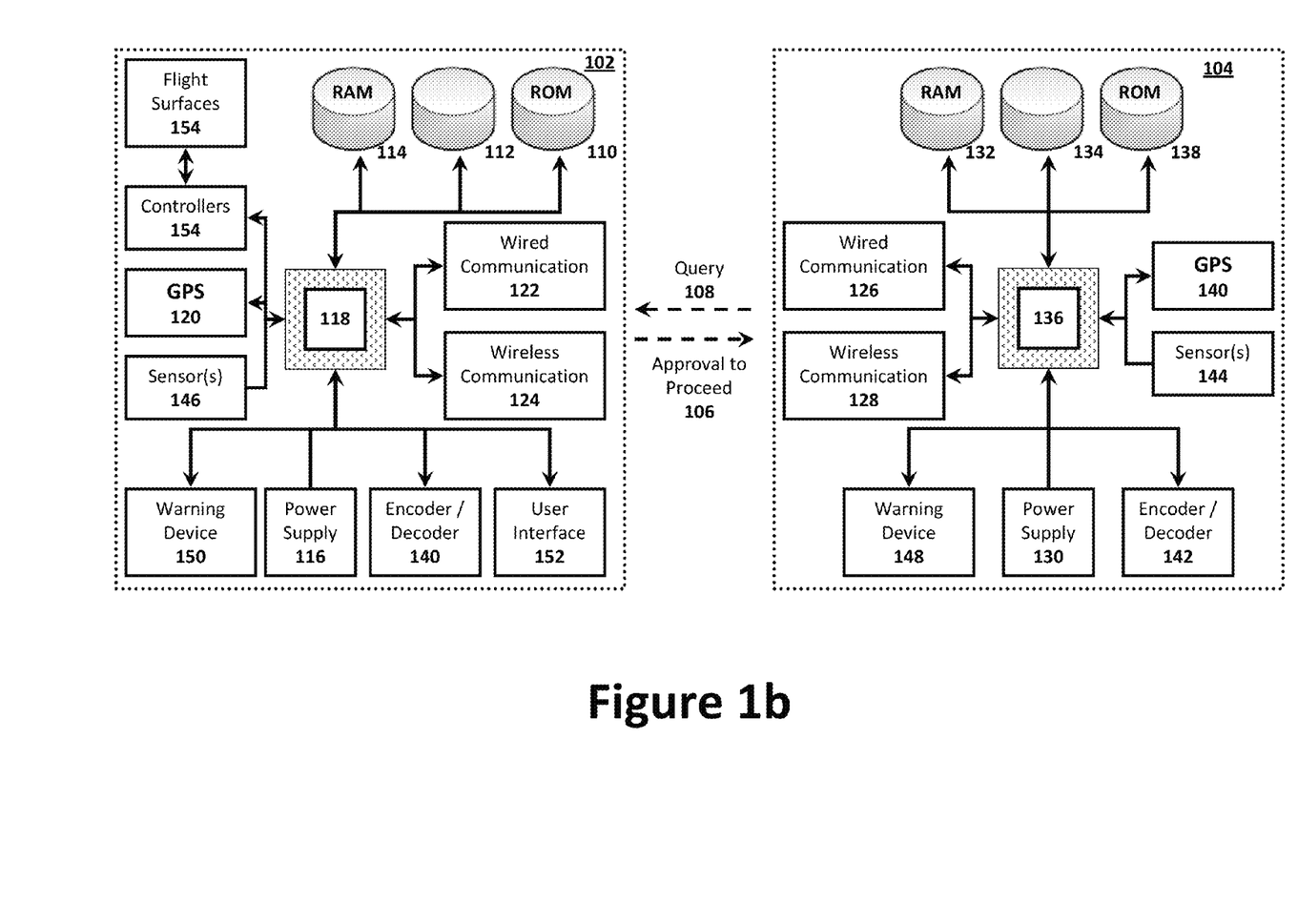
FIG. 1b is a diagram illustrating the system of FIG. 1a in greater detail.

Turning now to FIG. 1b, the system of FIG. 1a is shown in greater detail. A suitable FCS 102 may contain, for example, a user interface 152, flight controllers 154, flight control surfaces 154, a processor 118, memory/data storage 110, 112, 114, a Global Positioning System (GPS) device 120, sensors 146, and communication means 122, 124. For example, to process and manipulate data, a FCS processor 118 may be equipped to run software which may be stored to ROM 110, RAM 112, or one or more other computer-readable storage mediums 112. To protect the processor from malicious attempts to read unencrypted data, the processor may be manufactured in accordance Federal Information Processing Standard (FIPS) Publication 140-2 (FIPS PUB 140-2). FIPS PUB 140-2 is a U.S. government computer security standard used to accredit cryptographic modules. For additional information regarding IPS PUB 140-2, see, for example, http://csrc.nist.gov/publications/fips/fips140-2/fips1402.pdf.

While a GPS device is described, other techniques and/or devices may be used in conjunction with, or in lieu of GPS technology, to determine the location of the vehicle. For example, an FCS 102 may employ triangulation techniques and/or be programmed to associate a location with known radio signals.

Similarly, data collected or created by the FCS 102 may be stored to RAM 114, ROM 110, or another suitable storage medium 112 for longer-term retention. The FCS 102 may also include a GPS navigation system 120 to supply the aircraft with, for example, data related to location, speed, etc. The FCS 102 may further comprise a user interface 152 allowing an operator (e.g., either human or computer-implemented, either of which may be local or remote) to input commands and/or control operation of FCS 102. The user interface may be coupled with the FCS 102, and may include, for example, a computer, a keyboard, mouse, touch screen, joystick, and the like. For controlled flight, the FCS 102 includes one or more flight controller devices 154, including, for example, aileron servos, ruder servo, etc. Data collected or created by FCS 102 may be communicated with a HBWRL System 104 and/or any other device capable of wired or wireless communication using either a wired communication link 122 or the wireless communication link 124. Processor 118 and other hardware may be powered by power supply 116, which may be alternating or direct current (e.g., traditional line current, battery power, solar power, wind power, etc.). To monitor the various flight conditions, the FCS 102 may further comprise one or more sensors 146 (e.g., weather radar, engine sensors, vertical/directional gyroscopes, accelerometer, thermometer, altimeters, etc). To increase security, the FCS 102 may further comprise an encoder/decoder 140 for encoding and decoding signals communicated with other devices, such as, for example, the HBWRL System 104. The FCS 102 may further comprise a alarm/warning device 150 (e.g., audio and/or visual indicators) to alert a user of one or more events including, for example, sudden descent, risk of collision, ground proximity, etc.

A HBWRL System 104 may contain, for example, a processor 136, memory/data storage 132, 134, 136, sensors 144, GPS 144, and communication means 126, 128. Typically, HBWRL System 104 components would be independent of PCS system 102 components; however, in certain situations, components may be shared. For example, for the sake of convenience, the two systems 102, 104 may share a common power source (e.g., the aircraft's primary power supply) or a common data storage system. To process and manipulate data, an HBWRL processor 136 may be equipped to run software which can be stored to ROM 138, RAM 132, and/or one or more other computer-readable storage mediums 134. Similarly, data collected or created by HBWRL System 104 may be stored to RAM 132, ROM 138, and/or another suitable storage medium 134 for longer-term retention. The HBWRL System 104 may also include a GPS navigation system 140 for supplying data related to location, speed, etc. Data collected or created by the HBWRL System 104 may be communicated with a FCS 102 and/or any other device capable of wired or wireless communication. The processor 136 and other hardware may be powered by power supply 130, which may be alternating or direct current (e.g., traditional line current, battery power, solar power, wind power, etc.). For security purposes, the HBWRL System may also comprise an encoder/decoder 142 for encoding and decoding signals communicated with other devices, such as, for example, the FCS 102. Communication between HBWRL System 104 and FCS 102 may be accomplished using either a wired communication link 126 or the wireless communication link 128. HBWRL System 104 may further comprise an alarm/warning device 148 (e.g., audio and/or visual indicators) for notifying the user that, for instance, the aircraft has breached a maximum range value and is being re-routed. HBWRL System 104 may also employ one or more sensors 144 to assists in determining whether an aircraft (i) is traveling too far from its take-off point, (ii) is attempting to take-off at with an excessive weight (e.g., greater than 500 kg) or (iii) is otherwise deviating from a predetermined flight plan. The one or more sensors 144 may include, for example, engine sensors, vertical/directional gyroscopes, accelerometer, thermometer, altimeters, etc.

To maintain separation between a HBWRL System 104 and FCS 102, a HBWRL System 104 should not share components with the FCS 102, with the possible exception of power source and other basic resources of that nature. Separation ensures that the HBWRL System would not be required to rely on the FCS's calculations and/or otherwise be influenced by the FCS 102 and/or it's operators. This separation may be especially useful when a third party wishes to regulate, or otherwise restrict, an aircraft. Therefore, according to a preferred embodiment, an HBWRL System 104 would be an entirely separate hardware-only system that may be coupled to a FCS 102 by way of a communication link (either wired or wirelessly coupled). Under this embodiment, the HBWRL System may be, for instance, a self contained device or system installed on an aircraft in communication with the aircraft's FCS. Under this embodiment, the FCS would continually query the HBRWL device seeking an approval-to-proceed signal, wherein the absence of an approval-to-proceed signal would require that the aircraft change it's flight plan and/or flight path.

The HBWRL System and/or functionality may be implemented using, for example, a Field-programmable Gate Array (FPGA) or Application-specific Integrated Circuit (ASIC). An FPGA is an integrated circuit designed to be configured by the customer or designer post-manufacturing. The FPGA configuration is generally specified using a hardware description language (HDL), similar to that used for an ASIC, and can be used to implement any logical function that an ASIC could perform. The ability to update the FPGA functionality after shipping, partial re-configuration of the portion of the design and the low non-recurring engineering costs relative to an ASIC design (notwithstanding the generally higher unit cost), offer advantages in certain applications. Alternatively, a more traditional ASIC may be employed, including, for example, Altera's HardCopy III ASICs. For further information on FPGAs and Altera's HardCopy III ASICs, see, for example, http://en.wikipedia.org/wiki/Field-programmable_gate_array and http://www.altera.com/products/devices/hardcopy-asics/hardcopy-iii/hc3-index.jsp. ASICs have the virtue of being non-reprogrammable (unlike FPGAs), yet share some of the low-cost attributes of FPGAs.

While a preferred embodiment is directed to an HBWRL System where HBWRL functionality is implemented via an entirely separate hardware-only system, the HBRWL functionality may be integrated via firmware within the FCS. For instance, a non-modifiable logic chip may be coupled with the FCS to carry out HBRWL functionality. However, this configuration can have drawbacks. For instance, the HBRWL may rely on the FCS's sensors, components, and calculations that may be exposed to tampering (e.g., by the aircraft operator) and/or other interference, thereby avoiding the HBRWL's aircraft-restricting functionality. Nevertheless, it should be appreciated that the HBRWL functionality of the present invention may be implemented in an FCS using firmware integration techniques.

Similarly, HBRWL functionality may be integrated with the FCS's software. Unfortunately, this embodiment also suffers from a number of draw backs. For instance, in a situation where an aircraft is being regulated by a third party, simply imposing restrictions using software can be hazardous because the aircraft operator may simply re-code the aircraft FCS's software thereby bypassing the restrictive software. Furthermore, software implementation is typically not acceptable under government-imposed guidelines, such as the MTCR guidelines. Nevertheless, it should be appreciated that the HBRWL functionality of the present invention may be implemented in an FCS through installation of software. HBWRL System functionalities will now be described in greater detail.

Regardless of implementation method, a HBWRL System is capable of detecting an aircraft that is in violation of its range/weight restriction (e.g., in the case of MTCR Category II compliance, has travelled more than 300 km from the point of take-off and/or has a load in excess of 500 kg). A GPS device (e.g., a GPS receiver), independent from the FCS's, may be built into the HBWRL System. This GPS receiver may be used to generate position and velocity signals, which, under the preferred embodiment, are to be used only for the benefit of the HBWRL System. These position and velocity signals are typically converted from a serial stream (which is the output of typical commercial GPS chip-sets) into two parallel signal buses. One bus carries the position (latitude and longitude) to the HBWRL System circuitry that needs it, and the other carries the velocity (i.e., groundspeed). Recorded location data may be stored within the HBWRL System's memory device, or it may be communicated to a remote database, or internet-connected computer, using, for example, a cellular (e.g., GPRS or SMS), radio, or satellite modem embedded in the unit. The GPS functionality allows the aircraft's location to be displayed against a map backdrop either in real time or when analyzing the track later, using GPS tracking software.

A default operation of the HBWRL System is to store the take-off position when a take-off is detected—assuming no illicit operating was detected; however, depending on the use, a take-off position may be a known, stored value (e.g., a location representing the aircraft's home base). To detect take-off, a take-off detection circuit may use both position and velocity data to detect the start of the take-off roll. The take-off detection circuit compares the velocity signal to a preset, non-modifiable threshold (e.g., 20 knots) while the altitude is low and constant, and when groundspeed exceeds the threshold, causes the position to be stored in memory. The take-off position is compared to the current position by a range calculation circuit. As long as the difference between the two locations is less than a present known value (e.g., 300 km in the case of MTCR Category II compliance), the HBWRL System will continuously output an Approval-to-Proceed signal, and the FCS will continue to fly the airplane along its commanded path.

Figure 2:
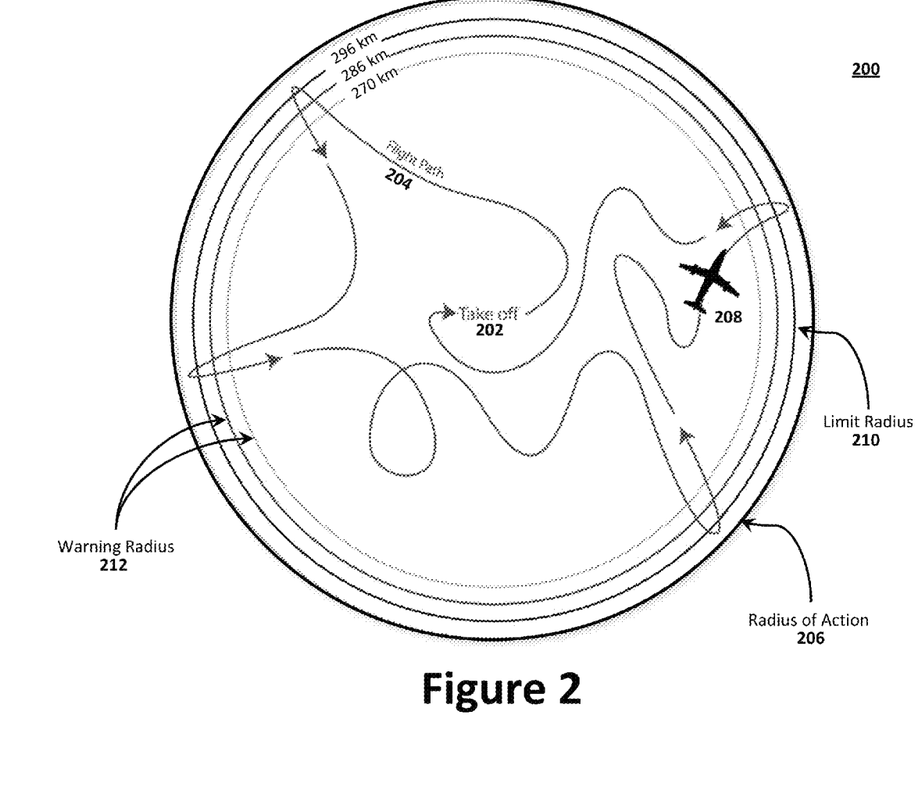
FIG. 2 is a diagram illustrating an exemplary UAV/OPA range limitation System.

Turning now to FIG. 2, a diagram is shown illustrating an aircraft flight plan 204 under an exemplary HBWRL System. Under the HBWRL System, an aircraft, such as a UAV or a OPA, may take off at take-off point 202 and freely navigate within a predetermined radius (e.g., 300 km) of take-off point 202. However, if the aircraft 208 follows flight path 204, causing the aircraft 208 to stray near the radius of action 206 (e.g., the maximum range), the range-limitation system would cease communication of the approval-to-proceed signal, thereby causing aircraft 208 to adjust its flight path 204 such that the aircraft is heading away from the radius of action 206 (e.g., closer to the take-off location 202). To avoid traveling outside of the radius of action 206, the range-limitation system could also provide the aircraft 208 with a warning signal indicating that it is approaching the radius of action 206 and/or a signal causing the aircraft to travel away from the radius of action 206. For example, as seen in FIG. 2, system 200 may provide a warning signal to the FCS, or aircraft operator, if the aircraft 208 has crossed one or more warning radii 212 (e.g., 270 and/or 285 kilometers away from take-off point 202). These warning signals would indicate to the aircraft and/or operator that the plane is approaching its radius of action 206 and should consider modifying its flight plan 204. While the example provides 270 km and 285 km as warning threshold values, these threshold values are merely exemplary and may be adjusted to provide an aircraft with either earlier or later warning signals. Upon reaching the present limit radius 210 (e.g., 295 km), the aircraft will be required to reroute such that the aircraft 208 does not travel further from the take-off point 202.

While the example of FIG. 2 is based on a system with a radius of action 206 set to 300 kilometers, it would be obvious to one having skill in the art to adjust these values to accommodate the needs of the individual aircraft and/or system. For example, a user may wish to keep an aircraft confined within a larger or smaller radius of action. Accordingly, depending on, for example, the radius of action 206, the warning radius 212 may be adjusted to provide a desired amount of warning time/distance.

The HBWRL System may also be enabled to detect an aircraft that is in violation of its payload restriction by using the flight dynamics of a take-off to detect and limit the aircraft's weight. The HBWRL System may measure, for example, airspeed and pitch angle, using sensors independent of those used by the FCS. Like the GPS equipment, these sensors are preferably built into the HBWRL System. For example, an inclinometer may be used to sense the increase in pitch angle as the nose is raised for take-off. Generally speaking, the physics of flight require that an increased take-off weight be accompanied by either a larger pitch angle or a higher airspeed. According to the preferred embodiment, the HBWRL System could be enabled to detect both parameters. In operation, the pitch angle at the start of the take-off roll may be stored, and then subtracted from the pitch angle during the take-off. If the increase in pitch is excessive when compared to a known value for a known payload, or if the airplane accelerates to too high a speed, the airplane will not be permitted to continue the take-off.

Figure 3:
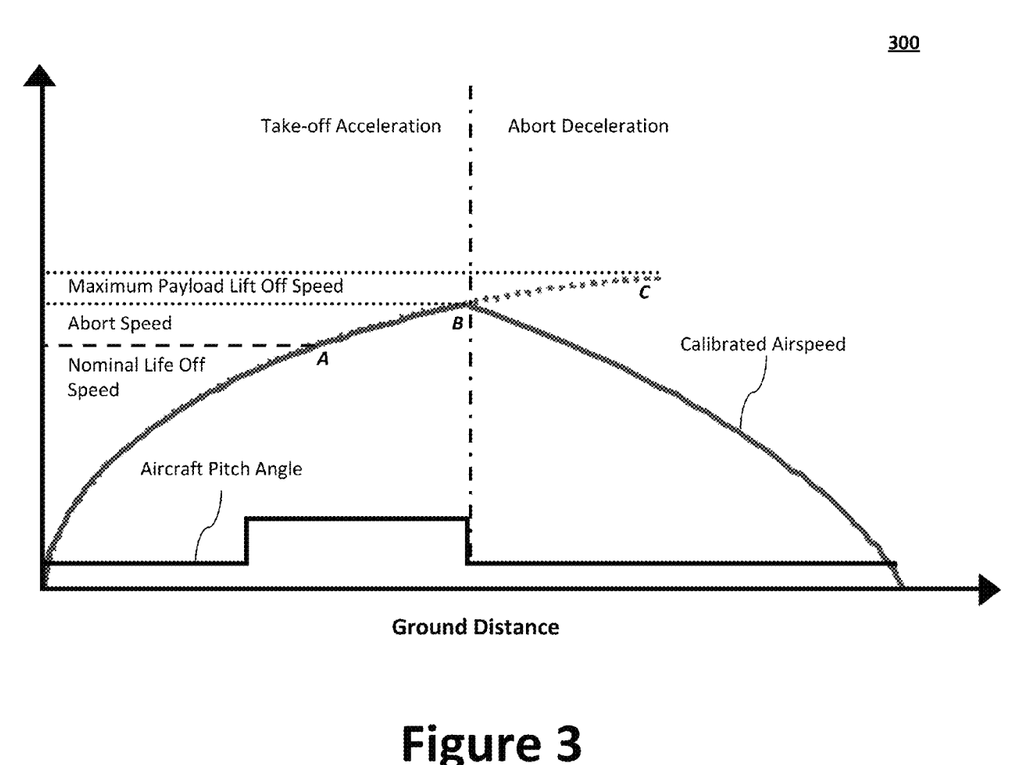
FIG. 3 is a graph illustrating an exemplary take-off profile.

For instance, referring now to FIG. 3, a diagram illustrates an exemplary speed at which an aircraft may be instructed to abort. As an aircraft travels along a run way, the take-off acceleration, illustrated as a curve in FIG. 3, increases as a function of the ground distance until the aircraft has either (i) become airborne or (ii) aborted take-off. During take-off, the payload of an aircraft will impact the take-off acceleration needed in order to become airborne. Accordingly, an aircraft take-off may be aborted if the take-off acceleration exceeds a threshold value indicating that the payload is greater than a known value. For example, an aircraft carrying a minimal payload may typically become airborne at point A with a nominal take-off acceleration. However, an aircraft carrying a maximum payload (e.g., 500 kg) will require that the take-off acceleration increase to the speed at point C. To prevent an aircraft from meeting or exceeding the maximum payload liftoff speed at point C, an abort threshold may be set to a take-off speed just below the maximum payload liftoff speed at point B. For instance, as seen on the graph, an abort threshold speed (e.g., a maximum take-off acceleration value) may be set at point B. Thus, the aircraft may operate normally until the acceleration speed as met the abort speed threshold at point B, in response, the aircraft would then decelerate and take-off would be aborted. The threshold may be set to match the needs of the user. For instance, a user may wish to abort a flight where an acceleration speed indicating a 450 kg payload is reached; alternatively, a user may wish to abort a flight only when an acceleration speed indicating a 499 kg payload is reached.

In order to comply with the weight and distance restrictions, an FCS may query a HBWRL System at regular intervals (e.g., every 1-300 seconds, more preferably, 1-180 seconds, even more preferably, 1-120 seconds, most preferably, 1-60 seconds), requesting an approval-to-proceed signal. For enhanced security, requests from the FCS to the HBWRL System may be encrypted. If no violations are detected (e.g., the aircraft is within range of the take-off point and/or the weight has not exceeded the limit), the HBWLR system will respond with an approval-to-proceed signal. The approval-to-proceed signal may be encrypted using known encryption techniques by, for example, the HBWRL System, prior to being communicated to the FCS. The FCS may then decrypt the signal to reveal the data from the HBWRL System using known decryption techniques, including, for example, a decryption key. This encryption and decryption process is intended to prevent spoofing of the HBWRL System Approval-to-Proceed signals thereby increasing the security of the overall system.

Virtually any known encryption algorithm or method may be used to encrypt communications between the HBWRL System and the FCS. Naturally, the level of encryption may be adjusted based on the level of security desired for a particular system. Cryptography, the science of encryption, is primarily based on mathematical algorithms that scramble unencrypted written information, also known as "plaintext," into an incomprehensible mass of characters of encrypted data, known as "ciphertext." A key may used to change the plaintext into ciphertext. Since the plaintext is in electronic form, the encryption is often done at a bit level. A matching key may then be used to decode the data once the data has been received by the recipient. The length of the key determines the encryption level, so the larger the key in bits, the more encrypted the plaintext will be. Another aspect of cryptography is the type of key used. For instance, there are two types of key encoders, or ciphers—block ciphers and stream ciphers. Block ciphers take a group of bits from the plaintext and then mathematically apply the key. Stream ciphers convert the plaintext one bit at time. Exemplary encryption techniques may include, for example, Data Encryption Standard (DES), Triple-DES, Advanced Encryption Standard (AES), and Skipjack Algorithms. Encryption systems are often grouped into families. Common families include symmetric systems (e.g., AES) and asymmetric systems (e.g., RSA); they may alternatively be grouped according to the central algorithm used (e.g. elliptic curve cryptography). Each of these is of a different level of cryptographic complexity and thus it is usual to have different key sizes for the same level of security, depending upon the algorithm used. For example, the security available with a 1024-bit key using asymmetric RSA is considered approximately equal in security to an 80-bit key in a symmetric algorithm. The Advanced Encryption Standard, published in 2001, uses a key size of at least 128 bits, but also can use keys up to 256 bits (a specification requirement for submissions to the AES contest). Therefore, a HBWRL System user may elect to use a key of virtually any length depending on the desired security level for the aircraft. Another encryption method includes quantum encryption. Quantum encryption, or cryptography, refers to the use of quantum mechanical effects to perform cryptographic tasks and/or to break cryptographic systems. For additional information regarding quantum encryption, see, for example, Lo, Hoi-Kwong et al., *Measurement Device Independent Quantum Key Distribution*, Phys. Rev. Lett. 108, 130503 (May 30, 2012).

In operation, a HBWRL System will deny (i.e. stop producing/communicating) an approval-to-proceed signal for one of three reasons: 1) exceeding a preset distance (e.g., 300 km) from the take-off position, 2) attempting to take-off with an excessive payload, and/or 3) attempting to reboot in-flight. In-flight reboots may be detected by having the first fix from the GPS indicate a high groundspeed. The In-flight Reboot Detected signal is asserted in this case, which causes the approval-to-proceed signal to be gated off (i.e. stays at zero). This condition is permanent: the only way to resume normal operation is to reboot again, this time with the aircraft on the ground.

Figure 4:
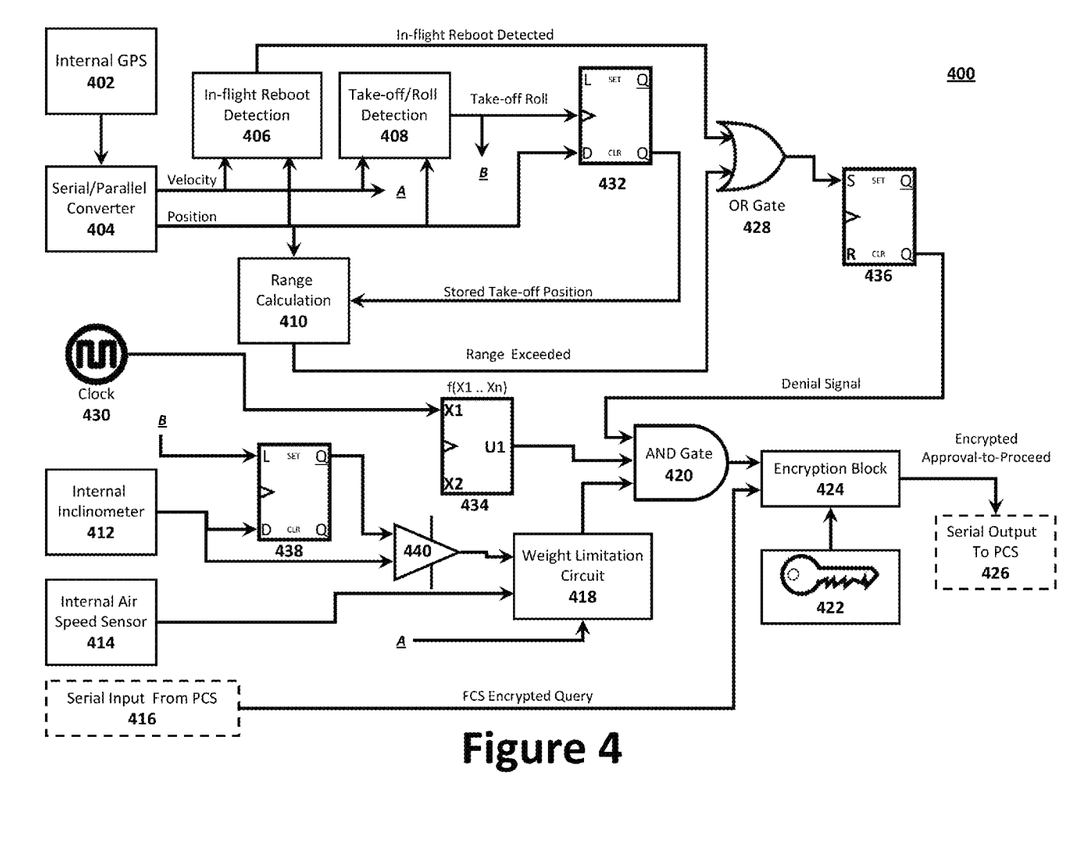
FIG. 4 is an exemplary block diagram of the HBWRL System.

Turning now to FIG. 4, an exemplary HBWRL System is illustrated for providing an approval-to-proceed with flight signal to an aircraft's FCS. The HBWRL System 400 contains an internal GPS device 402, preferably separate from the FCS's GPS device, that may be used to dynamically determine the location of the aircraft. A serial/parallel converter 404 may be used to split the singular data stream from the internal GPS device 402 into two signals, one representing velocity, the other representing position.

To determine whether an aircraft is in-range, the velocity signal may be communicated to (i) the in-flight reboot detection circuit 406, (ii) the take-off/roll detection circuit 408 and/or (iii) the weight limitation circuit 418. The position signal may be communicated to (i) the in-flight reboot detection circuit 406, (ii) the take-off/roll detection circuit 408, and (iii) a D Flip-Flop 432. The D Flip-Flop 432 is used to take a logic input (e.g., a high (1) or a low (0)) and pass it to its output. The in-flight reboot detection circuit 406 is enabled to detect a reboot and, if detected, communicates a high signal (1) to OR-Gate 428. The take-off/roll detection circuit 408 may also be enabled to detect a take-off/roll and communicate any detection of a take-off/roll to D Flip-Flop 432. The D Flip-Flop 432 receives the aircraft position from the serial/parallel converter 404 and a signal when a take-off/roll has occurred from the take-off/roll detection circuit 408. The take-off/roll is used to trigger storage of the current location to yield a stored take-off position, which is then communicated to the range calculation circuit 410. The range calculation circuit 410 may receive the current position from the serial/parallel converter 404 and the stored take-off position from D Flip-Flop 432, and calculates the difference between the two values (e.g., distance between the two locations) and compares it to a preset threshold value (e.g., 295 km). The output signal is communicated to OR-Gate 428 as either (i) a 1 (i.e., range exceeded) or (ii) a 0 (i.e., range not exceeded). OR-Gate 428, which also receives an input from the in-flight reboot detection circuit 406, compares the two inputs and outputs either (i) a low if both inputs are low, or (ii) a high if either input is high. The OR-Gate 428 output is communicated to a S node of an SR NOR latch Flip-Flop 436. If OR-Gate 428 output is 0, then Q=0 and Q=1; however, if the OR-Gate 428 output is 1, then Q=1 and Q=0. Thus, if either the aircraft range value has been exceeded (e.g., aircraft has traveled too far) or the system has been rebooted, then S is high (1) and output Q is high (1). If either of these conditions is met, a high (1) signal is communicated to AND-Gate 420.

To determine whether the aircraft is carrying an excessive payload by monitoring take-off acceleration, an internal inclinometer 412, internal air speed sensor 414, clock and weight limitation circuit 418 may be employed. The internal inclinometer 412 is used for measuring angles of slope (e.g., or tilt), elevation or depression of the aircraft with respect to gravity. The internal air speed sensor 414 is used to measure the air speed surrounding the aircraft. As illustrated in FIG. 4, data generated by internal inclinometer 412 and take-off/roll detection circuit 408 is communicated to D Flip-Flop 438. The Q output of D Flip-Flop 438 is then communicated to NOT-Gate 440 along with a direct feed from the internal inclinometer 412. The output from NOT-Gate 440 is communicated to weight limitation circuit 418. The weight limitation circuit 418 uses algorithms and/or calculations to determine the take-off acceleration based on (i) air speed values from the internal air speed sensor 414, (ii) velocity from serial/parallel converter 404, and (iii) values representing the incline from the internal inclinometer via the D Flip-Flop 438 and NOT-Gate 440. The weight limitation circuit 418 may be used to compare the calculated take-off acceleration to one or more known threshold values and outputs wherein either (i) a high (1) signal is outputted if the calculated take-off acceleration exceeds a known threshold value or (ii) a low (0) signal is outputted if the calculated take-off acceleration does not exceed a known threshold value. The output from weight limitation circuit 418 may be communicated to AND-Gate 420. Clock 430 may be connected to Flip-Flop 434 at node X1. Flip-Flop 434 output (U1) may then be communicated to AND-Gate 420.

AND-Gate 420 may be used to compare the three logic inputs and outputs either (i) a high (1) if the system has determine that the aircraft is out of range, carrying an excessive payload and/or has rebooted or (ii) a low (0) if the system has determined that the aircraft is in-range, carrying payload less than the present threshold and has not rebooted. AND-Gate 420 output is used to trigger the HBWRL abort/re-route command. For instance, if a high (1) is outputted, the HBWRL System will not communicate an approval-to-proceed signal. However, if a low (0) is outputted, the HBWRL System will communicate an approval-to-proceed signal. In operation, a signal from the PCS may be communicated to the HBWRL System via the serial input from PCS 416. Encryption block 424, based on AND-Gate's 420 output, may generate the approval-to-proceed signal. If an approval-to-proceed symbol should be communicated to the PCS, encryption block 424 may encrypt the data using key 422 prior to communication to the PCS via serial output to PCS 426. To decrypt the data communication, PCS may have, or have access to, an equivalent key thereby allowing the PCS to read and understand the encrypted approval-to-proceed signal.

Figure 5:
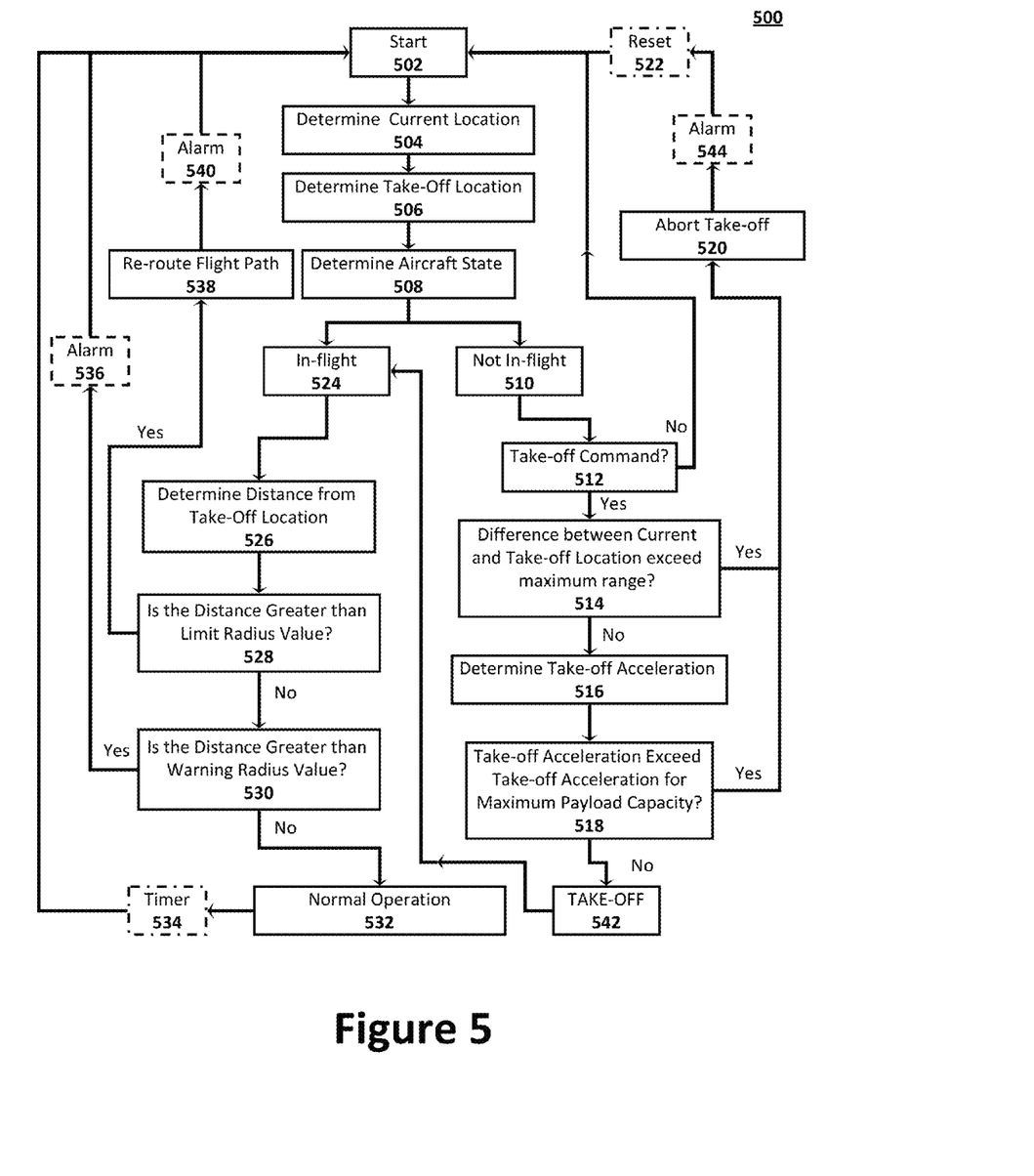
FIG. 5 is an exemplary flow chart that illustrates the basic functionality of a HBWRL System.

Referring now to FIG. 5, a flow chart 500 is provided that illustrates the basic functionality of a HBWRL System. The HBWRL System may be activated at step 502 manually by flight personnel or automatically by the FCS upon, for example, activation of the aircraft's electrical system. Once the HBWRL System has been activated at step 502, the system will may use a GPS device and/or techniques (e.g., triangulation) to determine the current location of the aircraft at step 504. The HBWRL System will then determine the aircraft's take-off location at step 506. The take-off location may be, for instance, a stored value (e.g., GPS coordinates) from a previous mission, coordinates representing the aircraft's home base (e.g., the hanger/airport where the aircraft typically resides) or any other coordinates that a user may store to represent the take-off location. Alternatively, if no take-off location value is stored, the take-off location may be set to the current location; under this embodiment, the location may be updated to the location upon actual take-off (e.g., at step 542). The HBWRL System may then determine the current status of the aircraft at step 508 (e.g., whether the aircraft is In-flight 524 or Not In-flight 510). If the aircraft is Not In-flight 510, the system determines if a take-off is expected at step 512. If the aircraft take-off command has not been provided, the system may return to the start position at step 502. If a take-off command has been provided at step 512, the system then determines the distance between the current location of step 504 and the take-off location of step 506.

If the distance is greater than a preset maximum range value at step 514 (e.g., 295-300 km in the case of MTCR Category II compliance), take-off is aborted at step 520. Take-off may be aborted at 520 by, for example, sending a signal to the FCS triggering an engine kill command (e.g., cut off fuel/power supply to the engines/motors). To notify an operator, the system may trigger an alarm at step 544, the alarm being enabled to provide an auditory and/or visual signal to an operator indicating that the take-off has been aborted. If a take-off has been aborted at step 520, the system may be reset at 522, thereby permitting the system to return to the start position at 502.

If the distance is less than a preset maximum range value at step 514 (e.g., 295-300 km in the case of MTCR Category II compliance), take-off is permitted. The system may then determine and/or dynamically monitor the take-off acceleration at step 516. If, during take-off (e.g., while accelerating down the runway), the take-off acceleration exceeds a preset threshold take-off acceleration value at step 518, take-off is aborted at step 520. A preset threshold take-off acceleration value may be equal to a value just under the threshold take-off acceleration value necessary for carrying a load meeting or exceeding a particular payload limit. For instance, in the case of MTCR Category II compliance, it may be determined that an aircraft carrying a payload of 500 kg requires a take-off acceleration of X; thus, a preset threshold take-off acceleration value may be set to just under X (e.g., X−n). Using this example, a take-off may be aborted if the take-off acceleration value equals X−n, indicating that aircraft is carrying a payload that violates the maximum payload restriction.

If, during take-off, the take-off acceleration remains at or below a preset threshold take-off acceleration value at step 518, take-off is permitted and the aircraft becomes airborne at step 542. Once airborne, the aircraft would be deemed to be In-flight at step 524.

Retuning now to step 508, the HBWRL System may determine the current status of the aircraft. If the aircraft is In-flight 524, the system may determine the distance between the current location of step 504 and the take-off location of step 506.

If the distance between the two locations is greater than a preset maximum range value at step 528 (e.g., 295-300 km in the case of MTCR Category II compliance), the aircraft is instructed to re-route the flight path at 538. Re-routing the flight path would cause the aircraft to not travel any further from the take-off location. For instance, re-routing may cause the aircraft to travel toward the take-off location; alternatively, the aircraft may travel just within the radius of action. In the event an aircraft is re-routed at step 538, an alarm may be triggered at step 540 to notify the user that the aircraft has breached the maximum range value and is being re-routed. Once the aircraft has been re-routed, the system may restart the process at step 502.

If the distance between the two locations is less than or equal to a preset maximum range value at step 528 (e.g., 295-300 km in the case of MTCR Category II compliance), the aircraft will maintain a normal flight plan. However, the aircraft may continually monitor its positions to determine if the aircraft is near the maximum range value but has not yet been breached. For instance, at step 530, the aircraft may compare the current distance between the two locations to one or more warning thresholds. The system may check to determine whether the aircraft has breached one or more warning radii (i) dynamically, (ii) at fixed time intervals, and/or (iii) upon request by the operator or FCS.

If a warning radius has been breached at step 530, an alarm may be triggered at step 536 to notify the user that the aircraft has breached a warning radius and should consider adjusting its flight plan. The alarm may also provide, for example, (i) the distance from the take-off point, (ii) current speed, (iii) distance from the limit radius, and/or (iv) estimated time before the aircraft will breach the limit radius. Once the alarm has been triggered at step 536, the system may restart the process at step 502.

If a warning radius has not been breached at step 530, the aircraft will resume normal flight operation at step 532. Normal operation may continue with the system in standby until, for instance, a timer at step 534 indicates that the system should re-check the various flight parameters/measurements. The timer may cause the system to loop after a preset period of time (e.g., every 1-300 seconds, more preferably, 1-180 seconds, even more preferably, 1-120 seconds, most preferably, 1-60 seconds).

While the present invention has been described with respect to what are currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, all brochures, and all other published documents discussed above are hereby incorporated by reference into the Detailed Description of the Preferred Embodiment.

What is claimed is:

1. A self-contained hardware based range and weight limitation device for providing information regarding limitations to a vehicle's range and payload weight, the device configured to be installed on an already-operating vehicle and in communication with the vehicle's flight control system, the device comprising:
   a locating device for determining the vehicle's current location;
   a processor operatively coupled to a memory device;
   a transmitter device enabled to communicate an approval-to-proceed signal with the vehicle's flight control system, wherein the flight control system is spatially and mechanically separate from the hardware based weight and range limitation system;
   application specific range limitation circuitry operatively coupled to the processor for dynamically calculating the distance between the vehicle's current location and a stored location, wherein the calculated distance is compared to a stored maximum distance value; and
   application specific weight limitation circuitry operatively coupled to the processor for dynamically calculating the vehicle's take-off acceleration, wherein the calculated take-off acceleration is compared to a stored maximum take-off acceleration value; wherein communication of the approval-to-proceed signal to the flight control system via the transmitter device is permitted if (i) the calculated distance is less than the maximum distance value and (ii) the calculated take-off acceleration is less than a maximum take-off acceleration.

2. The device of claim 1, wherein the stored location is the vehicle's location upon take-off.

3. The device of claim 1, wherein the approval-to-proceed signal is encrypted using a key having a size of at least 128 bits.

4. The device of claim 1, wherein the stored maximum take-off acceleration value is the take-off acceleration value necessary to take-off with a payload value of about 500 kg or more.

5. The device of claim 1, wherein the stored maximum distance value is about 300 km or more.

6. The device of claim 1, wherein the transmitter device communicates a warning signal to the flight control system if the calculated distance exceeds a warning distance value, wherein the warning distance value is less than the maximum distance value.

7. The device of claim 1, wherein communication of the approval-to-proceed signal to the flight control system via the transmitter device is prohibited if an in-flight reboot has been detected.

8. The device of claim 1, wherein the device for determining the vehicle's current location uses GPS technology.

9. A self-contained hardware based range and weight limitation method for providing information regarding limitations to a vehicle's range and payload weight, the method performed by a device configured to be installed on an already-operating vehicle and in communication with the vehicle's flight control system, comprising the steps of:
   using a locating device to determine the vehicle's current location;
   dynamically calculating the distance between the vehicle's current location and a stored location using application specific range limitation circuitry operatively coupled to a processor, wherein the calculated distance is compared to a stored maximum distance value;

calculating the vehicle's take-off acceleration using application specific weight limitation circuitry operatively coupled to the processor, wherein the calculated take-off acceleration is compared to a stored maximum take-off acceleration value;

communicating an approval-to-proceed signal to a flight control system via a transmitter device if (i) the calculated distance is less than the maximum distance value and (ii) the calculated take-off acceleration is less than a maximum take-off acceleration, wherein the flight control system is spatially and mechanically separate from (i) the application specific range limitation circuitry and (ii) the application specific weight limitation circuitry.

10. The method of claim 9, wherein the stored location is the vehicle's location upon take-off.

11. The method of claim 9, wherein the approval-to-proceed signal is encrypted using a key having a size of at least 128 bits.

12. The hardware based range and weight limitation method of claim 9, wherein the stored maximum take-off acceleration value is the take-off acceleration value necessary to take-off with a payload value of about 500 kg or more.

13. The method of claim 9, wherein the stored maximum distance value is about 300 km or more.

14. The method of claim 9, further comprising the step of communicating a warning signal to the flight control system if the calculated distance exceeds a warning distance value, wherein the warning distance value is less than the maximum distance value.

15. The method of claim 9, wherein communication of the approval-to-proceed signal to the flight control system via the transmitter device is prohibited if an in-flight reboot has been detected.

16. The method of claim 9, wherein the device to determine the vehicle's current location uses GPS technology.

17. A self-contained hardware based range and weight limitation device for providing a signal corresponding to limitations to a vehicle's range and payload weight, the device configured to be installed on an already-operating vehicle and in communication with the vehicle's flight control system, the device comprising:
  a locating device for providing the vehicle's current location;
  a processor operatively coupled to a memory device;
  a transmitter device enabled to communicate an approval-to-proceed signal with a flight control system;
  application specific range limitation circuitry operatively coupled to the processor for dynamically calculating the distance between the vehicle's current location and a stored location, wherein the calculated distance is compared to a stored maximum distance value; and
  application specific weight limitation circuitry operatively coupled to the processor for dynamically calculating the vehicle's take-off acceleration wherein the calculated take-off acceleration is compared to a stored maximum take-off acceleration value;
  wherein communication of the approval-to-proceed signal to the flight control system via the transmitter device is permitted if (i) the calculated distance is less than the maximum distance value and (ii) the calculated take-off acceleration is less than a maximum take-off acceleration
  wherein the flight control system is spatially and mechanically separate from (i) the application specific range limitation circuitry and (ii) the application specific weight limitation circuitry.

18. The hardware based range and weight apparatus device of claim 17, wherein the stored location is the vehicle's location upon take-off.

19. The hardware based range and weight apparatus device of claim 17, wherein the approval-to-proceed signal is encrypted using a key having a size of at least 128 bits.

20. The hardware based range and weight apparatus device of claim 17, wherein the approval-to-proceed signal is encrypted using quantum encryption techniques.

21. The device of claim 17, wherein the stored maximum take-off acceleration value is the take-off acceleration value necessary to take-off with a payload value of about 500 kg or more.

22. The device of claim 17, wherein the stored maximum distance value is about 300 km or more.

23. The device of claim 17, wherein the transmitter device communicates a warning signal to the flight control system if the calculated distance exceeds a warning distance value, wherein the warning distance value is less than the maximum distance value.

24. The device of claim 17, wherein communication of the approval-to-proceed signal to the flight control system via the transmitter device is prohibited if an in-flight reboot has been detected.

25. A self-contained hardware-based range and weight limitation device for providing an approval-to-proceed signal regarding a vehicle's range and payload weight, the device configured to be installed on an already-operating vehicle and in communication with the vehicle's flight control system, the device, comprising:
  a locating device for providing the vehicle's current location;
  a processor operatively coupled to a memory device;
  a transmitter device enabled to communicate an approval-to-proceed signal with a flight control system;
  range limitation circuitry operatively coupled to the processor for calculating the distance between the vehicle's current location and a stored location, wherein the calculated distance is compared to a stored maximum distance value; and
  weight limitation circuitry operatively coupled to the processor for calculating the vehicle's take-off acceleration, wherein the calculated take-off acceleration is compared to a stored maximum take-off acceleration value;
  wherein communication of the approval-to-proceed signal to the flight control system via the transmitter device is prohibited if (i) the calculated distance is greater than the maximum distance value and (ii) the calculated take-off acceleration is greater than a maximum take-off acceleration
  wherein the flight control system is spatially and mechanically separate from (i) the range limitation circuitry and (ii) the weight limitation circuitry.

\* \* \* \* \*